Feb. 15, 1927.                                                        1,617,748
D. S. DUNN
APPARATUS FOR MEASURING AND DISPENSING LUBRICATING OILS AND OTHER LIQUIDS
Filed May 18, 1925                              2 Sheets-Sheet 2

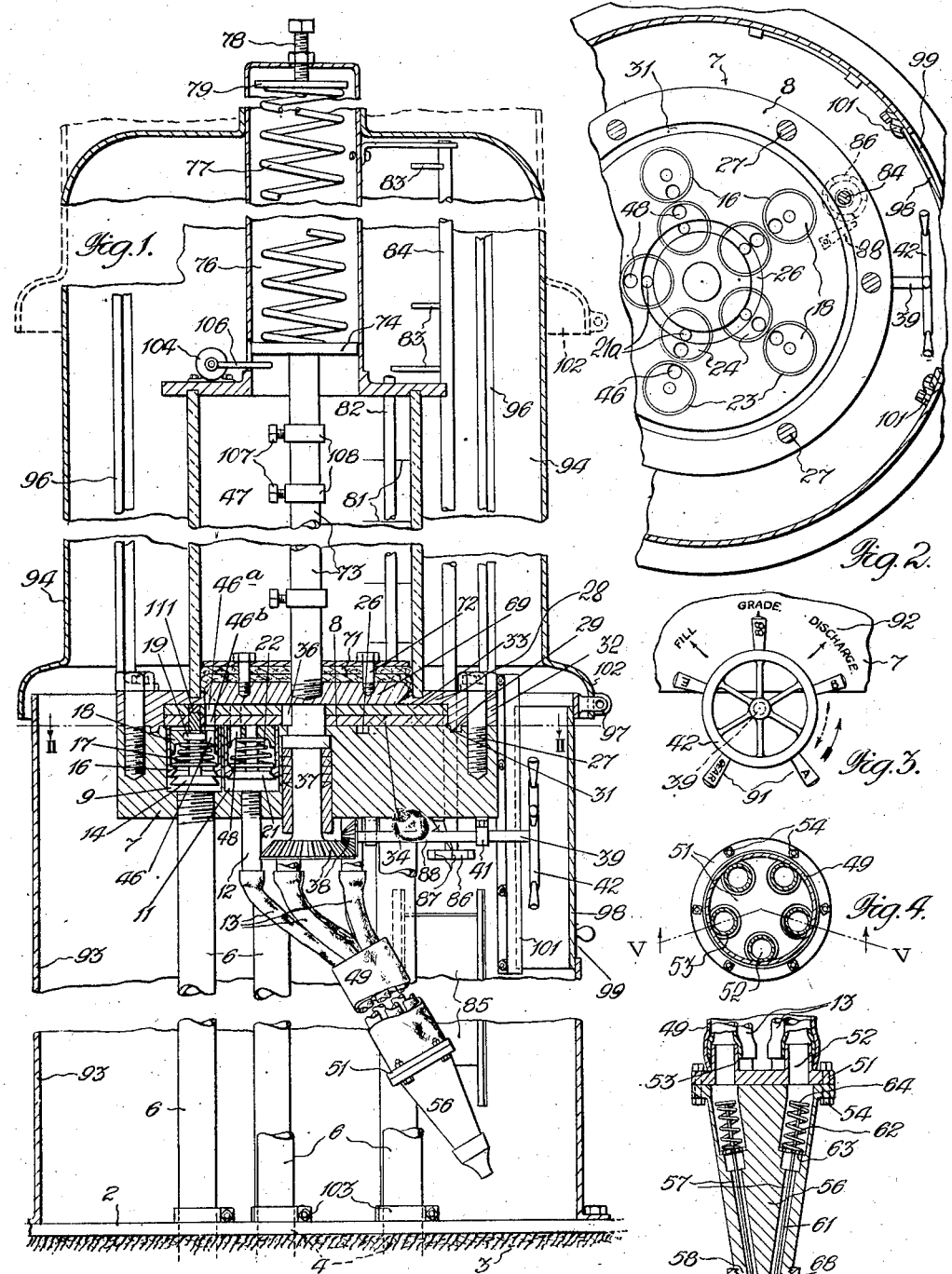

Inventor:
Digby Spencer Dunn
By ............... Attorney

Patented Feb. 15, 1927.

1,617,748

UNITED STATES PATENT OFFICE.

DIGBY SPENCER DUNN, OF KEW, MELBOURNE, VICTORIA, AUSTRALIA.

APPARATUS FOR MEASURING AND DISPENSING LUBRICATING OILS AND OTHER LIQUIDS.

Application filed May 18, 1925. Serial No. 31,230.

This invention relates to an improved apparatus for measuring and dispensing, from a common measuring chamber, a variety of different liquids or grades of liquid, more particularly lubricating oils.

The primary object of the invention is to provide an efficient and reliable apparatus whereby the various liquids are supplied to and delivered from the measuring chamber through separate inlet and delivery passages or conduits which are individually provided with independent inlet and discharge valves. These valves may be actuated from a common hand operated member whereby the different liquids may be separately admitted to and delivered from the measuring chamber as desired without mixing and consequent contamination of the respective liquids. It will be understood that this is an important point in the dispensing of liquids such for instance, as lubricating oils for automobiles.

Other objects and features of the invention will, however, be apparent from the following description and the appended claims.

But in order that this invention may be better understood reference will now be made to the accompanying drawings which are to be taken as part of this specification and read herewith:

Figure 1 is a vertical section of an apparatus constructed in accordance with the invention, parts being broken away for convenience of illustration.

Figure 2 is a horizontal section taken on line II—II of Figure 1, parts being broken away for convenience of illustration.

Figure 3 is a detail view showing a hand wheel which controls the opening of the inlet and discharge valves, said wheel being arranged in front of indication markings on an adjacent part of the apparatus.

Figure 4 is a cross sectional view taken at the inner end of a nozzle member having a series of liquid passages to which the various discharge pipes leading from the measuring chamber are connected.

Figure 5 is a longitudinal section of said nozzle member taken on line V—V of Figure 4 and showing the automatic escape valves located in the nozzle passages.

Figure 6:
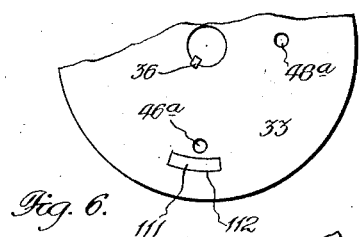
Figure 6 is a fragmentary plan view of an upper rotary disc which constitutes one of the valve operating members by which the inlet and discharge valves controlling the flow of the liquids to and from the measuring chamber are actuated.
Figure 7:
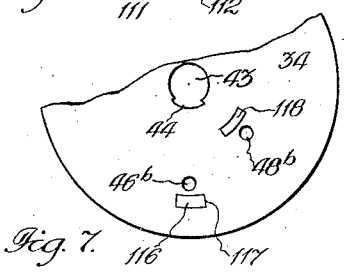
Figure 7 is a fragmentary plan view of a lower rotary disc which co-operates with the disc seen in Figure 6.
Figure 8:
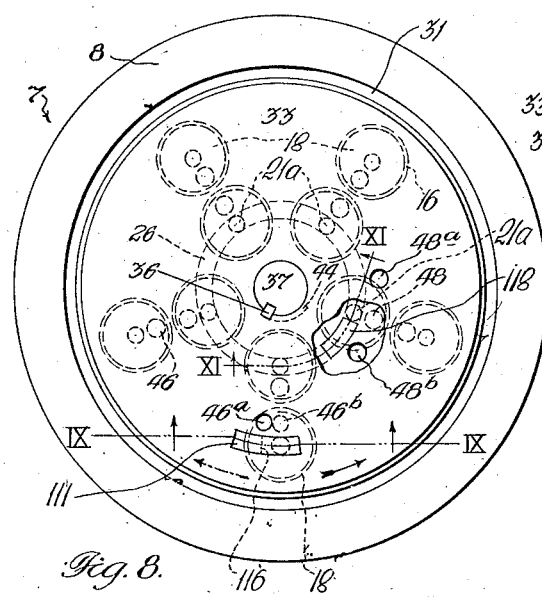
Figure 8 is a plan view on a larger scale showing the discs seen in Figures 6 and 7 mounted upon the upper surface of a valve box which contains said inlet and discharge valves. Parts of said discs are broken away for convenience of illustration.
Figure 11:
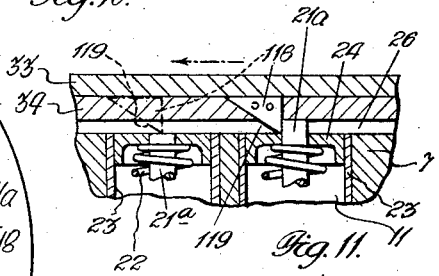

Figure 11 is a fragmentary section taken approximately on the line XI—XI of Figure 8 and showing two adjacent discharge valves and a third cam which is carried by the lower rotary disc to open said discharge valves. In full lines the back of this cam is shown engaging one of the discharge valve stems to prevent movement of the lower disc to the right whilst in dotted lines at the left of the figure the cam is shown opening an adjacent discharge valve.

Figure 12:
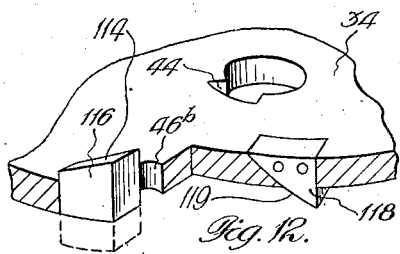

Figure 12 is a fragmentary perspective view, partly in section of the lower disc showing the fixed and vertically slidable cams thereof.

Figure 13:
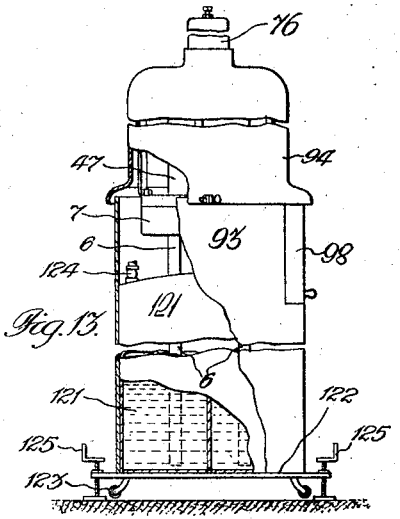

Figure 13 is a view on a reduced scale of a portable apparatus in accordance with the invention, parts being broken away for convenience of illustration.

Referring to the drawings the numeral 2 (Figure 1) indicates a base plate which may be suitably mounted on the ground or suitable foundation indicated at 3 and has openings indicated at 4 to pass the inlet pipes or conduits 6 through which the various oils or other liquids may pass from suitable reservoirs or storage tanks, which may be located underground or in any other convenient position.

The upper ends of the inlet pipes 6 are connected to a valve box 7 preferably of circular form and having a flat upper surface 8 on which the rotary valve operating members or discs hereinafter described are mounted. Formed in the valve box 7 and extending downwardly from the upper surface 8 thereof are inlet valve chambers 9 and discharge valve chambers 11. The lower ends of the inlet valve chambers 9 connect with the inlet pipes 6 whilst the lower ends of the discharge valve chambers 11 communicate with the upper sections of discharge pipes 12. The lower or outer sections of these discharge pipes are formed by flexible tubes or hose 13.

The valve chambers 9 accommodate inlet valves 14 which are preferably of the poppet type and engage seatings around the lower ends of sleeves 16 which are fixed within the respective valve chambers 9. These inlet valves are normally closed by coiled springs 17 the upper ends of which may engage caps 18. These caps of the inlet valves are adapted to slide vertically within the respective valve chambers during the opening and closing of the respective valves as hereinafter described, the inlet valve stems being suitably fixed as at 19 to the sliding caps 18 for this purpose. The upper faces of these sliding caps normally lie flush with the upper flat face 8 of the valve box 7.

The discharge valve chambers 11 accommodate similar discharge valves 21 which are controlled by springs 22 and seat within the lower ends of open ended sleeves 23 which are fixed within the respective valve chambers. The upper ends of the discharge valve stems 21ª normally project through cap members 24 which are in this case fixed within the sleeves 23, the projecting upper ends of the discharge valve stems being located within an annular groove 26 which is formed in the upper face 8 of the valve box as seen clearly in Figures 2 and 11.

Secured to the upper face of the valve box 7 by bolts 27 or the like, is a ring 28 which may have an annular depending tongue 29 engaging a corresponding annular recess 31 in the upper face of the valve box 7 to form a liquid tight joint between the two members. This ring 28 is provided with a downwardly projecting annular flange 32 and the space between said flange and the upper face of the valve box accommodates upper and lower rotary valve operating members or discs indicated at 33 and 34 respectively.

The upper disc 33 is keyed or feathered as at 36 to the upper end of a vertical shaft 37 which is geared as at 38 to a horizontal shaft 39 which may be mounted in bearings 41 beneath the valve box and carries at its outer end an operating hand wheel 42 whereby the disc 33 may be turned in either direction. It may be preferable for the gears 38 to be of equal ratio instead of unequal ratio as shown in Fig. 1.

Figure 9:
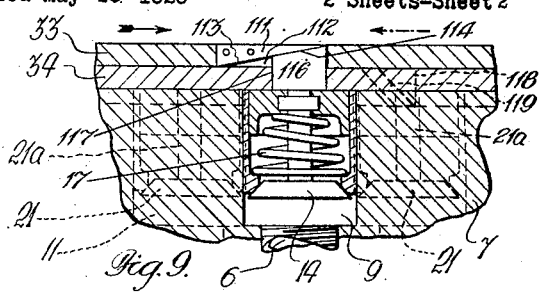
Figure 9 is an enlarged vertical section taken approximately on the line IX—IX of Figure 8 and showing co-operating cams of said upper and lower rotary discs in position above one of the inlet valves and about to open the latter.
Figure 10:
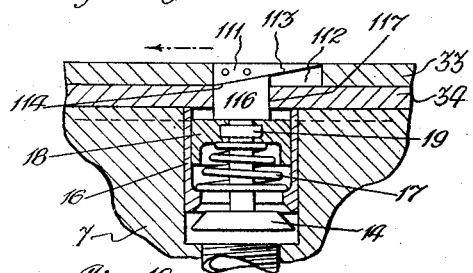
Figure 10 is a view similar to Figure 9 but showing the upper disc moved in relation to the lower disc so as to open the inlet valve through the medium of said cams.

The lower disc 34 has a central hole 43 therethrough to freely accommodate the shaft 37, and opening into this central hole is a circumferential slot 44 to accommodate the projecting key 36 whereby the upper disc 33 may be partially rotated without influencing the adjacent lower disc which remains stationary during the movement of the upper disc from the position seen in Figure 9 to the position seen in Figure 10 and back to the position seen in Figure 9. These movements of the upper disc in relation to the lower disc are permitted by the slot 44 for the purpose hereinafter mentioned.

Formed through each of the sliding caps 18 of the inlet valves 14 is an inlet port 46, these ports being adapted to register with an inlet port 46ª through the upper disc 33 and a corresponding inlet port 46ᵇ formed through the lower disc 34 whereby the desired oil or other liquid is permitted to pass from the respective inlet valve chamber 9 to the measuring chamber 47, hereinafter described, when the two discs have been brought into position to open the respective inlet valve 14.

A discharge port 48 is formed through each of the fixed caps 24 of the discharge valves 21, a corresponding discharge port 48ª being formed through the upper disc 33 and a discharge port 48ᵇ through the lower disc 34 whereby the liquid is delivered from the measuring chamber 47 to the discharge pipes 12—13 when the two rotary discs are brought into position to open the respective discharge valves 21 at which point the discharge ports 48ª and 48ᵇ of the discs register with the port 48 of the respective discharge valve.

The flexible outer sections 13 of the discharge pipes are preferably encased within a flexible cover 49 and the outer ends of said flexible pipe sections may be connected to a plate 51 (Figures 1 and 5) having orifices 52 surrounded by nipples 53 which are adapted to receive the outer ends of the flexible discharge pipes or hose. The plate 51 may be secured by bolts 54 or the like to the flanged inner end of a nozzle member 56 which is provided with a series of internal liquid passages 57 converging longitudinally from the inner to the outer end 58 of the nozzle member as seen in Figure 5. These passages 57 correspond in number to the discharge pipes 13 and the outer end of each passage is normally closed by an escape valve 59 having a stem 61 which extends longitudinally into the respective passage and is fitted with a light closing spring 62 which may be located within an enlarged part of the respective passage 57 and between a perforated washer 63 or the like and a head 64 on the inner end of the valve stem. When one of the discharge valves 21 is opened to deliver the oil from the measuring chamber the respective escape valve 59 automatically opens under the pressure of the discharging liquid and closes to exclude foreign matter from the respective nozzle passage 57 when all of the liquid has been forced from the measuring chamber as hereinafter described.

If desired the nozzle 56 may be provided at its outer end with a detachable cap 66 having a single outlet orifice 67. This cap may be screwed or otherwise detachably connected to the outer end of the nozzle member as at 68 and may thus be removed for cleansing after each use so that any mixing or contamination of the discharging liquid with a previously discharged liquid, which may possibly have remained in small quantity within the orifice 67, is prevented. Alternatively, the cap 66 may be dispensed with and the various liquids discharged direct from the respective escape passages 57.

The measuring chamber 47 is constructed wholly or partially of transparent material such as glass, and mounted within this chamber is a piston 69 which is preferably provided with a plurality of cup leathers or washers 71 of larger diameter than the piston body 69 and secured to the latter by screws or the like as at 72. These cup leathers or washers are adapted to press tightly against the inner wall of the measuring chamber so as to effectively clean the liquid from said wall as the piston descends. It will be noted that when the piston is in its lowermost position, as in Figure 1, its body portion 69 engages the face of the upper disc 33 so that the entire measured quantity of liquid is discharged from the measuring chamber by way of the respective discharge valve.

The piston 69 is attached to the lower end of a piston rod 73 and to the upper end of this rod is attached a head or plunger 74 adapted to slide within a vertical cylinder 76 which may accommodate a compression spring 77, the latter being adapted to force the piston 69 downwardly and thus facilitate the discharge of the liquid from the measuring chamber. The spring 77 is compressed on the upward stroke of the piston as the liquid is being admitted to the measuring chamber, this feeding of the liquid to the measuring chamber being preferably effected by compressed air introduced behind the body of liquid in the storage tank or reservoir from which the supply is taken. The downward movement of the piston may, if desired, also be effected or facilitated by compressed air admitted to the cylinder 76 instead of by the spring 77 which is however preferable. The power of the spring 77 may be adjusted by means of an adjusting screw 78 and adjustable plate 79 at the upper end of the cylinder 76.

In order to positively limit the upward movement of the piston 69 when the proper amount of liquid has entered the measuring chamber as indicated by the vertically spaced measurement markings or graduations 81 on the wall of the measuring chamber, a rod 82 may extend upwardly from the piston 69 through an opening in the top of the measuring chamber. The upper end of this rod is adapted to engage limit stops or arms 83 which project laterally from a vertical spindle 84 the lower end of which may be provided with a hand wheel 86 having circumferentially spaced graduations 87 corresponding with the radial limit stops 83 on the rod 84 and the graduations 81 on the measuring chamber. Thus by turning the hand wheel 86 so that the required graduation thereon registers with a pointer or the like, indicated at 88 and which may be carried on the valve box 7 or other convenient part, the corresponding radial stop 83 will be brought immediately over the rod 82 so that the upward movement of the piston will be arrested as its lower edge reaches the appropriate graduation 81 on the wall of the measuring chamber.

The hand wheel 42 which controls the valve operating mechanism or discs 33, 34 is preferably provided with a series of radially disposed handles 91 which may correspond in number to the various combinations of inlet and discharge valves, and, as seen in Figure 3, may bear indication markings denoting the various grades of oil or species of liquid to be dispensed. These handles 91 are adapted to act as pointers or indicators in conjunction with indication words or characters 92 which may be inscribed on the adjacent side face of the valve box 7 or other convenient part. Thus to measure and discharge a particular liquid such as a certain grade of oil, the handle 91 corresponding to that particular liquid is first moved to the position marked "Grade" in Figure 3, at which point the parts of the valve operating mechanism will be located ready to open the appropriate inlet valve 14, and then to the position "Fill," whereupon the respective inlet valve 14 is opened to admit the liquid to the measuring chamber. The respective handle 91 is then moved to the "discharge" position at which the appropriate discharge valve 21 is opened to deliver the liquid from the measuring chamber. These inlet and discharge operations will however be hereinafter more fully described.

The valve box 7 and the lower parts of the apparatus are preferably enclosed within a fixed lower casing 93 which may be suitably secured to the base plate 2 and is surmounted by a movable upper casing 94 which may be adapted to slide vertically upon uprights 96 and the cylinder 76 so as to uncover the measuring chamber 47 when the apparatus is in use. Any suitable means such as indicated at 97 may be provided to lock the upper casing 94 to the lower casing 93 when the apparatus is not required for use, and an access door 98 may be adapted to cover an opening 99 in said lower casing to thereby provide access to the hand wheels 42 and 86. The access door 98 may be adapted to slide vertically in suitable guides 101, the upward or opening movement of the door being prevented by means of a suitable catch (not shown) or by the presence of the flanged lower portion 102 of the upper casing 94, when the latter is in its lowered and locked position.

A sliding door 85 may also be provided to permit of the withdrawal of the flexible discharge pipes 13 and the nozzle member 56 from the interior of the lower casing where they may be stored when not in use.

Suitable means may also be provided for locking this door.

The liquid inlet pipes 6 may be fitted with vertically adjustable clamps or flange members 103 adapted to rest on the base plate 2 and thus support the valve box 7 and other parts in the desired position when the apparatus is being installed.

A cyclometer or counter device of any suitable known construction may be provided as indicated at 104 to register the quantity of liquid which has been dispensed. This counter device may be provided with an operating arm 106 projecting through an opening in the cylinder 76 above the measuring chamber so that its inner end is adapted to engage vertically spaced strikers on the piston rod 73. These strikers may consist of set screws 107 passing through collars 108 whereby they are secured to the piston rod in the desired vertically spaced positions which may correspond to the measurement markings or graduations 81 on the wall of the measuring chamber. Thus the upward movement of the piston causes the strikers 107 to successively actuate the counter 104 in accordance with the quantity of liquid admitted to the measuring chamber.

The upper rotary valve operating member or disc 33 is provided with an inclined cam face 113 which may be formed on the lower surface of a cam member 111 fixed within an aperture or pocket 112 (Figures 9 and 10) formed through said upper disc. This inclined cam face 113 is adapted to engage a corresponding inclined cam face 114 on the top of a co-operating cam member 116 which is adapted to slide vertically within a pocket or aperture 117 formed through the lower disc or valve operating member 34. The lower face of this cam member 116 is adapted to slide freely on the upper face 8 of the valve box 7 and, during the opening of one of the inlet valves 14, is adapted to engage the upper face of the sliding cap 18 on the respective inlet valve stem as indicated in Figure 10.

The vertically sliding cam 116 is somewhat shorter in a circumferential direction than the co-operating cam 111 of the upper disc so that the pocket 112, which is also longer than the cam 116, permits of a limited circumferential movement of the upper disc in relation to the lower disc during the opening and closing movement of any of the inlet valves 14. The degree of this relative movement of the two discs corresponds to the degree of movement of the key 36 in the circumferential slot 44 of the lower disc, 34 when the upper disc turns in relation to the lower disc as aforesaid.

The lower disc or valve operating member 34 also carries a fixed cam member 118 having an inclined cam face 119. The lower part or point of this cam 118 projects downwardly into the annular groove 26 in the upper face 8 of the valve box 7. The upper ends of the discharge valve stems 21ª also normally project into this groove 26 as previously mentioned, and whilst it will be evident that the inclined faces 119 of the cams 118 will permit the lower disc 34 to turn freely in one direction over the discharge valves, the movement of said lower disc in the opposite direction cannot exceed the distance between two of the adjoining discharge valve stems, owing to the engagement of the vertical end or back of the cam 118 with an adjacent valve stem 21ª as indicated at the right hand side of Figures 9 and 11. By this means the lower disc 34 is prevented from turning with the upper disc when the latter is moved to the right in Figures 9 and 11 or in the direction of the barbed arrows in Figures 8 and 9, to thereby force down the sliding cam 116 and open one of the inlet valves. When however the two discs are turned together to the left or in the direction of the dotted arrows in Figures 8 to 11, the cam face 119 will ride over the discharge valve stems so that the cams 111 and 116 may be moved bodily into position for opening the particular inlet valve required.

As seen in Figure 13 the apparatus may be rendered portable by mounting the liquid storage tanks or reservoirs, indicated at 121, upon a portable platform 122 which may be provided with transport wheels or the like 123 whereby the apparatus may be moved from place to place. A non-return valve 124 may be provided at the upper part of the reservoirs 121 whereby compressed air may be introduced into the latter above the liquid to force the latter up through the inlet pipes 6. One of these pipes passes from the lower part of each oil reservoir to the respective inlet valve chamber 9 in the valve box 7 which may be suitably mounted above the reservoirs 121. This portable apparatus may also be provided with casings 93 and 94 and other appurtenances as previously described, and levelling devices such as small screw jacks 125 may also be provided whereby the portable platform 122 and consequently the liquid level in the measuring chamber 47 may be kept perfectly horizontal when the apparatus is in use.

In operation the hand wheel 42 is turned in the direction of the dotted arrow in Figure 3 to bring one of the handles 91, corresponding to the particular liquid or grade of oil required, opposite the central indication mark 92 denoted "grade" in Figure 3. This movement of the handwheel 42 will move the discs 33, 34 bodily in the direction of the dotted arrows in Figs. 8 to 11 so as to bring the cams 111 and 116 of the two discs into position to open the appropriate inlet valve 14 as in Figure 9. It will be seen that movement of the hand wheel 42 and the discs 33, 34, in the reverse direction, as indicated by the barbed arrows in Figures 3, 8 and 9, will be limited by the engagement of the back or vertical end face of the discharge cam 118, against the projecting end of the first discharge valve stem lying behind and in the path of this cam as indicated for instance in full lines in Figure 11. The maximum degree of movement of the two discs in this reverse direction is thus limited to the circumferential distance between adjacent discharge valve stems, and the operator is thus prevented from turning the hand wheel 42 and the discs in the wrong direction when moving the parts into position for opening a selected inlet valve.

When the appropriate handle 91 has thus been moved to the first or central position indicated by the term "Grade" in Figure 3 the cams 111 and 116 are located, as seen in Figure 9, above the selected inlet valve 14 which controls the admission to the measuring chamber of the particular liquid required. To effect this opening of the desired inlet valve the hand wheel 42 is turned in the reverse direction as indicated by the barbed arrow in Figure 3 until the particular handle 91 coincides with the position marked "Fill". This causes the upper disc 33 to move back in the direction of the barbed arrows in Figures 8 and 9, independently of the lower disc 34, such independent movement being permitted by the slot 44 in the lower disc freely passing the key 36, and the pocket or recess 112 in the upper disc passing the sliding cam 116 in a circumferential direction as the upper disc is individually turned to the position seen in Figure 10. Thus the respective inlet valve 14 is depressed enabling the desired liquid to pass upwardly into the measuring chamber through the coinciding inlet ports 46, 46ª and 46ᵇ, the two latter ports being brought into registry with the port 46 of the respective inlet valve at this period.

It will be noted that during the short reverse movement of the upper disc as indicated by the barbed arrow in Figure 9, to thus open the required inlet valve, the lower disc 34 is prevented from turning in that direction owing to the engagement of the back or vertical end of the cam 118 with the adjoining discharge valve spindle 21ª as indicated in dotted lines at the right of Figure 9 and also in full lines at the right hand side of Figure 11.

It is now necessary to close the respective inlet valve and open the discharge valve 21 corresponding to the discharge pipe for the particular liquid in the measuring chamber. To effect this closing of the inlet valve and opening of the corresponding discharge valve, the hand wheel 42 is now again turned in the direction of the dotted arrow in Figure 3 to bring the respective handle 91 from the "fill" to the "discharge" position. The first part of this movement causes the upper disc 33 to move back in the direction of the dotted arrow in Figure 10 independently of the lower disc, until the latter is picked up by the key 36 engaging the other end of the slot 44, and the right hand end of the aperture 112 in Figure 10 engaging the sliding cam 116. During this independent forward movement of the upper disc it will be evident that the sliding of the cam 111 over the cam 116 in the direction of the dotted arrow in Figure 10 enables the cam 116 to rise in the aperture 117 and thus close the respective inlet valve 14, cutting off the supply of liquid past this valve to the measuring chamber.

It will also be evident that by engagement of the upper end of the rod 82 with the appropriate radial stop member 83 on the spindle 84 the upward movement of the piston 69 is positively arrested when the desired measured quantity of liquid in accordance with the circumferential position of the hand wheel 86, has entered the measuring chamber. Apart however from this stop mechanism, embodying the parts 82, 83, 84, 86, it will be seen that the admission of the liquid to the measuring chamber may be instantly cut off by the operator turning back the valve operating handwheel 42 so as to move the particular handle 91 from the "fill" position towards the "discharge" position immediately the lower edge of the piston 69 reaches the appropriate graduation 81 on the wall of the measuring chamber.

When the respective inlet valve has thus been closed by movement of the upper disc in the direction of the dotted arrow in Figure 10 as above mentioned, the corresponding discharge valve is opened by moving the hand wheel 42 still further in the direction of the dotted arrow in Figure 3 until the respective handle 91 coincides with the "discharge" position as indicated by the markings 92. This causes the two discs 33, 34 to move further in the direction of the dotted arrows in Figures 10 and 11 so that the discharge valve operating cam 118 is moved from the position shown in full lines to the approximate position indicated by dotted lines in Figure 11. It will be seen from the figure that owing to the engagement of the inclined front face of the cam 118 with the projecting upper end of the desired discharge valve stem 21ª, the latter is depressed to open the discharge valve and thus permit the measured quantity of liquid to pass out through the corresponding discharge pipe 12—13 from which it escapes through the respective passage 57 and past the escape valve 59 of said passage in the nozzle member 56.

This discharge of the oil is facilitated by the downward movement of the piston 69 under pressure of the spring 77 which causes slow moving liquids such as oils to be quickly discharged from the measuring chamber and discharge pipes.

The above cycle of operations is repeated when it is again desired to measure and dispense the liquids in the storage tanks or reservoirs, the operating handwheel 42 being first turned in the direction of the dotted arrow in Figure 3 to bring the appropriate handle 91 to the desired "grade" or like position whereupon it is moved in the reverse direction to the "fill" position and then again in the direction of the dotted arrow past the "grade" position and to the "discharge" position, thus successively opening and closing the desired inlet valve and opening the corresponding discharge valve when said inlet valve has closed.

It will be evident from the foregoing that various different liquids may be passed through the apparatus without contamination of the said liquids by mixing one with the other, the only points at which the various liquids may combine being within the inlet ports 46ª, 46ᵇ of the discs 33, and 34 which ports may retain a small quantity of the liquid after each discharging operation. It will be obvious however that owing to the relatively small dimensions of these ports the effects of mixing of the small body of liquid therein with the next measured quantity delivered from the measuring chamber will be negligible.

The efficiency of the invention is such that different liquids such as gasoline and lubricating oils may be dispensed from the same measuring chamber without contamination such as to materially affect the quality of the liquids.

Having now described my invention, what I claim as new and desire to secure by Letters Patent is:—

1. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, an inlet and a discharge valve for each inlet conduit and its associated discharge conduit arranged to control the passage of liquid through those conduits independently, and means for operating any selected pair of inlet and discharge valves to the exclusion of the other pairs.

2. In apparatus for measuring and dispensing lubricating oils and other liquids, a measuring chamber, a series of inlet conduits for different liquids leading to said chamber, a series of discharge conduits, one for each inlet conduit, leading from the measuring chamber, means for supplying liquid under pressure through said inlet conduits, and a series of separate and independently operable pairs of inlet and discharge valves, one pair of valves individual to each inlet conduit and its associated discharge conduit to control the passage of liquid through that pair of conduits to the exclusion of the others.

3. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, an inlet and a discharge valve for each inlet conduit and its associated discharge conduit arranged to control the passage of liquid through those conduits independently, and a hand operated member common to all of said valves to actuate any selected pair of inlet and discharge valves to the exclusion of the other pairs by movement of said hand operated member into different positions.

4. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, a series of pairs of inlet and discharge valves, one pair for each inlet conduit and its associated discharge conduit, arranged to control the passage of liquid through said conduits independently, and a hand wheel adapted for rotation in opposite directions to selectively operate any pair of valves to the exclusion of the other pairs.

5. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, a series of pairs of inlet and discharge valves, one pair for each inlet conduit and its associated discharge conduit, arranged to control the passage of liquid through said conduits independently, said valves being of the spring controlled poppet type and adapted to normally close under the influence of said springs, and means to selectively operate any pair of valves to the exclusion of the other pairs.

6. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, a series of pairs of inlet and discharge valves, one pair for each inlet conduit and its associated discharge conduit, arranged to control the passage of liquid through said conduits, and a valve operating mechanism associated with said valves and adapted to be moved into successive positions to open any selected inlet valve and subsequently open a corresponding discharge valve after said inlet valve has closed.

7. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, a series of pairs of inlet and discharge valves, one pair for each inlet conduit and its associated discharge conduit, arranged to control the passage of liquid through said conduits, and valve operating mechanism comprising a plurality of rotary members which are capable of turning bodily into position to open a selected valve, one of said members being also capable of independent movement to effect the opening of said valve.

8. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, a series of pairs of inlet and discharge valves, one pair for each inlet conduit and its associated discharge conduit, arranged to control the passage of liquid through said conduits, valve operating mechanism comprising a plurality of contiguous rotary members which are adapted to turn bodily in one direction into operative position to open a selected inlet valve, one of said members being also adapted for independent turning movement in the reverse direction to effect the opening of said valve, and means for automatically closing said valve when said independently movable member is turned back in the first named direction.

9. In apparatus for measuring and dispensing lubricating oils and other liquids, a measuring chamber, a series of inlet conduits for different liquids leading to said measuring chamber, a series of discharge conduits, one for each inlet conduit, leading from the measuring chamber, and a series of pairs of inlet and discharge valves, one pair for each inlet conduit and its associated discharge conduit, arranged to control the passage of liquid through said conduits, and valve operating mechanism comprising a plurality of rotary members which are adapted to turn bodily in one direction into operative position to open a selected inlet valve, one of said members being also adapted for limited independent movement in the opposite direction to effect the opening of said valve, the closing of which and the opening of a corresponding discharge valve are effected by subsequent movement of said operating members in the first named direction.

10. In apparatus for measuring and dispensing lubricating oils and other liquids, a valve box, a measuring chamber above the valve box, a series of pairs of inlet and discharge valves mounted in said valve box and adapted to separately control the flow of different liquids to and from the measuring chamber, rotary valve operating members common to all the pairs of valves and comprising upper and lower discs mounted between the valve box and the measuring chamber to operate any selected pair of valves to the exclusion of the other pairs, and a hand operated member for actuating said discs.

11. In apparatus for measuring and dispensing lubricating oils and other liquids, a valve box, a measuring chamber, a series of pairs of inlet and discharge valves mounted in said valve box and adapted to separately control the flow of different liquids to and from the measuring chamber, rotary valve operating members common to all the pairs of valves and comprising contiguous discs mounted between the valve box and the measuring chamber to operate any selected pair of valves to the exclusion of the other pairs, and a hand operated member for actuating said discs, said discs being mounted upon a common shaft to which one of the discs is fixed, while another of the discs is capable of remaining stationary during partial rotary movement of said shaft and the first-named disc.

12. In apparatus for measuring and dispensing lugricating oils and other liquids, a valve box, a measuring chamber above the valve box, a series of pairs of inlet and discharge valves mounted in said valve box and adapted to separately control the flow of different liquids to and from the measuring chamber, rotary valve operating members common to all the pairs of valves and comprising upper and lower discs mounted between the valve box and the measuring chamber to operate any selected pair of valves to the exclusion of the other pairs, a hand operated member for actuating said discs, said discs being mounted on a common vertical shaft, and a key fastening one of said discs to said shaft and extending beyond that disc, the other disc being provided with a circumferentially elongated slot at its inner periphery to freely accommodate said key.

13. In apparatus for measuring and dispensing lubricating oils and other liquids, a measuring chamber, a series of inlet conduits for different liquids leading to said measuring chamber, a series of discharge conduits, one for each inlet conduit, leading from said chamber, a series of pairs of inlet and discharge valves, one pair for each inlet conduit and its associated discharge conduit, arranged to control the passage of liquid through said conduits independently, valve operating mechanism common to all the pairs of valves and comprising a plurality of rotary members which are capable of turning bodily into position to open a selected valve, one of said members being also capable of independent movement to effect the opening of said valve, said rotary members being provided with co-operating cam faces adapted to engage and move relatively to each other whereby the opening of the inlet valves is effected.

14. In apparatus for measuring and dispensing lubricating oils and other liquids, a measuring chamber, a series of inlet conduits for different liquids leading to said measuring chamber, a series of discharge conduits, one for each inlet conduit, leading from said chamber, a series of pairs of inlet and discharge valves, one pair for each inlet conduit and its associated discharge conduit, arranged to control the passage of liquid through said conduits independently, and valve operating mechanism common to all the pairs of valves and comprising a plurality of rotary members adapted to turn bodily into position to open a selected valve, one of said members being also capable of independent movement to effect the opening of said valve, and a vertically slidable cam member mounted in an aperture or pocket in one of said rotary members and adapted to engage a co-operating cam member which is fixed upon an adjacent rotary member.

15. In apparatus for measuring and dispensing lubricating oils and other liquids, a measuring chamber, a series of pairs of spring closed inlet and discharge valves adapted to separately control the flow of different liquids to and from said measuring chamber, and valve operating members common to all the pairs of valves and comprising contiguous rotary discs associated with said valves to operate any selected pair of valves to the exclusion of the other pairs, a hand operated member for actuating said discs, and a slidable cam member mounted in an aperture in one of said discs, said slidable cam being provided with an inclined face adapted to engage a co-operating inclined face on a cam which is fixed in the other disc.

16. In apparatus for measuring and dispensing lubricating oils and other liquids, a valve box, a measuring chamber above the valve box, a series of pairs of inlet and discharge valves mounted in said valve box and adapted to separately control the flow of different liquids to and from the measuring chamber, and rotary valve operating members common to all the pairs of valves and comprising upper and lower discs mounted between the valve box and the measuring chamber to operate any selected pair of valves to the exclusion of the other pairs, a hand operated member for actuating said discs, a vertically slidable cam member mounted in the lower rotary disc and provided with an inclined upper face adapted to engage the inclined lower face of a cam which is fixed in the upper disc, said vertically slidable cam being adapted to enter a pocket in the upper disc, said pocket coinciding with the position of the co-operating cam face in said upper disc and being of greater circumferential length than said vertically slidable cam.

17. In apparatus for measuring and dispensing lubricating oils and other liquids, a measuring chamber, a series of inlet conduits for different liquids leading to said measuring chamber, a series of discharge conduits, one for each inlet conduit, leading from said chamber, a series of pairs of inlet and discharge valves, one pair for each inlet conduit and its associated discharge conduit, arranged to separately control the passage of liquid through said conduits, valve operating mechanism common to all the pairs of valves and comprising a plurality of rotary members adapted to turn bodily into position to open a selected valve to the exclusion of the other valves, and means to hold one of said rotary members against turning movement in one direction while an adjoining rotary member is independently turned in that direction to effect the opening of the selected valve.

18. In apparatus for measuring and dispensing lubricating oils and other liquids, a valve box, a measuring chamber above the valve box, a series of pairs of inlet and discharge valves mounted in said valve box and adapted to separately control the flow of different liquids to and from the measuring chamber, rotary valve operating members common to all the pairs of valves and comprising upper and lower discs mounted between the valve box and the measuring chamber, a hand operated member for actuating said discs to effect the opening and closing of a selected pair of valves to the exclusion of the other pairs, the upper surface of said valve box having an annular groove formed therein which is adapted to accommodate projecting ends of discharge valve stems, and a cam member fixed to and depending from said lower disc into said annular groove whereby said valves are opened by said cam member as the latter moves in one direction with the lower disc, reverse movement of this disc being arrested by engagement of the back of said cam member with the projecting end of an adjacent discharge valve stem.

19. In apparatus for measuring and dispensing lubricating oils and other liquids the combination of a valve box having inlet and discharge valve chambers therein, a measuring chamber associated with said valve box, pairs of spring closed inlet and discharge valves mounted in the respective valve chambers to individually control the flow of different liquids to and from said measuring chamber, and valve operating mechanism common to all of said valves for successively opening any selected inlet valve and its associated discharge valve to the exclusion of the other pairs of valves.

20. In apparatus for measuring and dispensing lubricating oils and other liquids, the combination of a valve box having inlet and discharge valve chambers therein, a measuring chamber mounted above said valve box, pairs of spring closed inlet and discharge valves mounted in the respective valve chambers to individually control the flow of different liquids to and from said measuring chamber, and valve operating mechanism common to all of said valves for successively opening any selected inlet valve and its associated discharge valve to the exclusion of the other pairs of valves, said valve mechanism comprising a plurality of rotary members disposed between the valve box and measuring chamber and having cam faces which are adapted to open said valves by pressure against the stems thereof.

21. In apparatus for measuring and dispensing lubricating oils and other liquids, a measuring chamber, a series of inlet conduits for different liquids leading to said measuring chamber, a series of discharge conduits, one for each inlet conduit, leading from said chamber, a series of pairs of inlet and discharge valves, one pair for each inlet conduit and its associated discharge conduit, fitted in said conduits and adapted to control the flow of liquid through said conduits, a valve operating mechanism common to all the pairs of valves and comprising a plurality of rotary discs actuated by a common hand operated member whereby any inlet valve and its associated discharge valve may be selectively and independently operated to the exclusion of the other pairs of valves, each disc having an inlet and a discharge port formed therein, and means whereby the corresponding ports of the two discs are brought into communication with a selected inlet or discharge valve when the respective valve is opened.

22. In apparatus for measuring and dispensing lubricating oils and other liquids, a measuring chamber, a valve box disposed below the measuring chamber and having a series of concentrically arranged inlet and discharge valve chambers for different liquids therein, spring controlled inlet and discharge valves mounted in the respective valve chambers, inlet and discharge pipes communicating with the respective valve chambers, ports leading upwardly from each of said valve chambers, and rotary discs mounted on the upper face of said valve box between the latter and the measuring chamber, said discs being adapted to control the opening of said valves and being provided with inlet and discharge ports through which the liquid is admitted to and delivered from the measuring chamber when the corresponding inlet or discharge ports of the discs are brought into register with the port of a selected valve chamber.

23. In apparatus for measuring and dispensing lubricating oils and other liquids, a measuring chamber, a series of inlet and discharge conduits leading respectively to and from said measuring chamber, a series of inlet and discharge valves arranged to control the passage of liquid through each of said conduits independently, a piston adapted to slide vertically within the measuring chamber, a rod or extension carried by said piston, and radially disposed stop members mounted on a vertical rotary spindle and adapted to be moved into position to engage said rod, said rotary spindle being adapted for hand operation to bring the desired stop member into the path of said rod whereby the upward movement of the piston is arrested when the desired quantity of liquid has been admitted to the measuring chamber.

24. In apparatus for measuring and dispensing lubricating oils and other liquids, a measuring chamber, a series of inlet and discharge conduits leading respectively to and from said measuring chamber, a series of inlet and discharge valves arranged to control the passage of liquid through each of said conduits independently, a piston adapted to slide vertically within said measuring chamber, and a compression spring arranged to force said piston downwardly in discharging the liquid from the measuring chamber, said spring being compressed during the upward movement of the piston as the liquid enters the measuring chamber.

25. In apparatus for measuring and dispensing lubricating oils and other liquids, a measuring chamber, a series of inlet and discharge conduits leading respectively to and from said measuring chamber, a series of inlet and discharge valves arranged to control the passage of liquid through each of said conduits independently, a piston adapted to slide vertically within said measuring chamber, a cylinder disposed above the measuring chamber, a piston rod upstanding from said piston and carrying at its upper end a head or plunger which slides within said cylinder, and a compression spring mounted within said cylinder between the upper end thereof and said head or plunger whereby said spring is compressed on the upward movement of the piston as the liquid enters the measuring chamber, and acts to force said piston downwardly in discharging the liquid from the measuring chamber.

26. In apparatus for measuring and dispensing lubricating oils and other liquids, a measuring chamber, a series of inlet conduits for different liquids leading to the measuring chamber, a series of discharge conduits, one for each inlet conduit, leading from said chamber, a series of pairs of inlet and discharge valves, one pair for each inlet conduit and its associated discharge conduit, arranged to control the passage of liquid through said conduits, mechanism settable to open any selected pair of valves to the exclusion of the other pairs, a nozzle member connected to said discharge valves by a series of flexible discharge pipes or hose, said nozzle member having a corresponding series of longitudinal discharge passages formed therethrough, and an automatic escape valve fitted in each of said passages of the nozzle member at the outer or discharge end thereof.

27. In apparatus for measuring and dispensing lubricating oils and other liquids, a measuring chamber, a series of inlet conduits for different liquids leading to the measuring chamber, a series of discharge conduits, one for each inlet conduit, leading from said chamber, a series of pairs of inlet and discharge valves, one pair for each inlet conduit and its associated discharge conduit, arranged to control the passage of liquid through said conduits, mechanism settable to open any selected pair of valves to the exclusion of the other pairs, a nozzle member connected to said discharge valves by a series of flexible discharge pipes, said nozzle having a corresponding series of discharge passages formed longitudinally therethrough, an automatic escape valve mounted in each of said nozzle passages, and a cap member adapted for detachable connection to the outer end of said nozzle member, said cap member having an orifice therethrough.

In testimony whereof I affix my signature.

DIGBY SPENCER DUNN.